United States Patent
Yoshida et al.

(10) Patent No.: US 6,317,160 B1
(45) Date of Patent: Nov. 13, 2001

(54) FRAME CONVERSION FOR ASYNCHRONOUS INPUT IMAGE SIGNALS

(75) Inventors: Kozo Yoshida, Zama; Mitsuo Yamamoto, Machida; Yasutake Inaba, Ebana, all of (JP)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/198,930

(22) Filed: Nov. 24, 1998

Related U.S. Application Data

(63) Continuation-in-part of application No. 09/159,992, filed on Sep. 24, 1998, now Pat. No. 6,172,710.

(30) Foreign Application Priority Data

Nov. 28, 1997 (JP) .................................................. 9-341883

(51) Int. Cl.⁷ .............................. H04N 9/475; H04N 7/01
(52) U.S. Cl. .......................... 348/473; 348/441; 348/153; 348/705; 348/715; 348/478
(58) Field of Search .................................... 348/441, 458, 348/459, 153, 159, 705, 714, 715, 722, 716, 477, 510, 478, 473, 476, 513, 512; H04N 7/01, 9/475

(56) References Cited

U.S. PATENT DOCUMENTS

| | | | |
|---|---|---|---|
| 4,109,276 | 8/1978 | Kopkins, Jr. et al. | 358/4 |
| 5,150,212 | * 9/1992 | Han | 358/147 |
| 5,267,039 | * 11/1993 | Elberbaum | 358/146 |
| 5,272,527 | * 12/1993 | Watanabe | 358/108 |
| 5,341,492 | 8/1994 | Sakata | 395/425 |
| 5,652,822 | * 7/1997 | Sugawara et al. | 386/46 |
| 5,661,527 | * 8/1997 | Ferguson | 348/558 |
| 5,739,864 | * 4/1998 | Copeland | 348/473 |
| 5,930,449 | * 7/1999 | Hwang | 386/95 |
| 5,946,049 | * 8/1999 | Cooper et al. | 348/513 |
| 5,990,974 | * 11/1999 | Amino et al. | 348/705 |
| 6,166,763 | * 12/2000 | Rhodes et al. | 348/143 |

* cited by examiner

Primary Examiner—Reinhard J. Eisenzopf
Assistant Examiner—Jean W. Désir
(74) Attorney, Agent, or Firm—Gregory L. Thorne

(57) ABSTRACT

A frame conversion device for switching between a plurality of image signals that are not synchronous and outputting each image signal continuously and synchronously. In addition, a desired signal is extracted from the continuous image signals and then output in parallel with the continuous image signals. The frame conversion device utilizes a frame conversion unit for recording an image signal optionally selected from a plurality of input image signals. A frame unit is utilized for reproducing a recorded signal outputted from the frame conversion unit independent of the operation of the frame conversion unit. The frame conversion unit includes an identification signal assigning part which assigns an identification signal to a non-image region of an image signal selected from a plurality of input signals. Frame-converting storage parts store the selected image signal. A signal output part selectively reads the image signal stored in each frame-converting storage device. The frame unit includes an identification signal detecting part that detects the identification signal included in the image signal produced in the frame conversion unit. A reproduction controlling part extracts a frame timing of the image signal assigned a predetermined identification signal. A recording storage part, at the extracted frame timing, stores an image signal corresponding to the predetermined identification signal and continuously outputs the image signal.

5 Claims, 3 Drawing Sheets

FRAME CONVERSION FOR ASYNCHRONOUS INPUT IMAGE SIGNALS

This patent application is a continuation-in-part of U.S. patent application Ser. No. 09/159,992 filed Sep. 24, 1998, now Pat 6,172,710.

BACKGROUND OF THE INVENTION

The invention relates to a frame converting device having a function to continuously output a plurality of image signals in a synchronized state while switching the image signals from a plurality of asynchronous inputs, and a function to extract a desired one of the continuous image signals from such plural inputs and outputs the extracted signal, and particularly, to improvement of a monitoring function when reproducing a recorded signal.

A known image switcher switches image signals from a plurality of cameras and the like and outputs the signals as one image signal. In switching such image signals, the input image signals from the cameras are often asynchronous with each other, but the disturbance of synchronous signals in the output image signals is inconvenient. In such case, all the input image signals are synchronized in advance by using a camera having a TBC (Time Base Corrector) function. Otherwise, asynchronous-synchronous conversion must be performed for each input by using a frame-converting device having a frame memory.

First problem: a camera having the TBC function is expensive, and therefore it is difficult to use the camera in a low-price route. Further, in the frame-converting device, the number of frame memories is the same as that of input image signals. While an image signal is stored into one of the frame memories, reading from another frame memory is performed.

Second problem: this type of device selects a either one of a first operation to switch the image signals from the plurality of cameras to outputs them as one image signal and to perform monitor display or VCR recording, or a second operation to extract a desired image signal from image signals from the plurality of cameras, switched to form one signal, and reproduced on a VCR or the like, and to perform display based on the extracted signal on the monitor.

In such frame-converting device, the number of frame memories must be the same as that of input image signals. This increases the price of the device. Further, the monitor display, and the VCR recording operation and cannot be performed in parallel to the VCR reproduction operation.

SUMMARY OF THE INVENTION

The present invention has been made to solve or at least mitigate the above-described problems, and has its object to realize a frame converting device which performs a first operation to continuously output a plurality of image signals in a synchronized state while switching the respective asynchronous image signals, by using fewer frame memories than the number of input image signals, in parallel to a second operation to extract a desired image signal from image signals switched to form one signal and to output the extracted signal.

Accordingly, a first aspect of the present invention provides a frame conversion device as recited in claim 1. Advantageous embodiments are defined in the dependent claims.

This frame converting device time-divisionally stores and reads a plurality of image signals by means of less frame-conversion storage means than input image signals while switching the signal input means and the signal output means. Thus the device continuously outputs the image signals in a synchronized state while switching a plurality of asynchronous image signals with less frame memories than input signals.

Further, the device detects the identification signals included in the image signals in frame units, extracts frame timing of an image signal with a predetermined identification signal from the image signals in frame units, stores the image signal of the frame timing, and continuously outputs the image signal. Thus, the device extracts a desired image signal from image signals switched to form one signal, and outputs the extracted image signal.

As the device has the recording frame-converting unit and the reproduction frame unit, the device can perform these two operations in parallel.

As to claim 3, the frame converting device can record the image signal from the recording frame-converting unit by the VCR, and when the recorded image is reproduced by the VCR, extract a desired image signal from image signals switched to form one signal by the reproduction frame unit.

As to claim 4, when a desired image signal is extracted from image, switched to form one signal and outputted the frame-converting device can extract the desired image signal based on input from the operation means.

These and other aspects of the invention will be apparent from and elucidated with reference to the embodiments described hereinafter.

Figure 1:
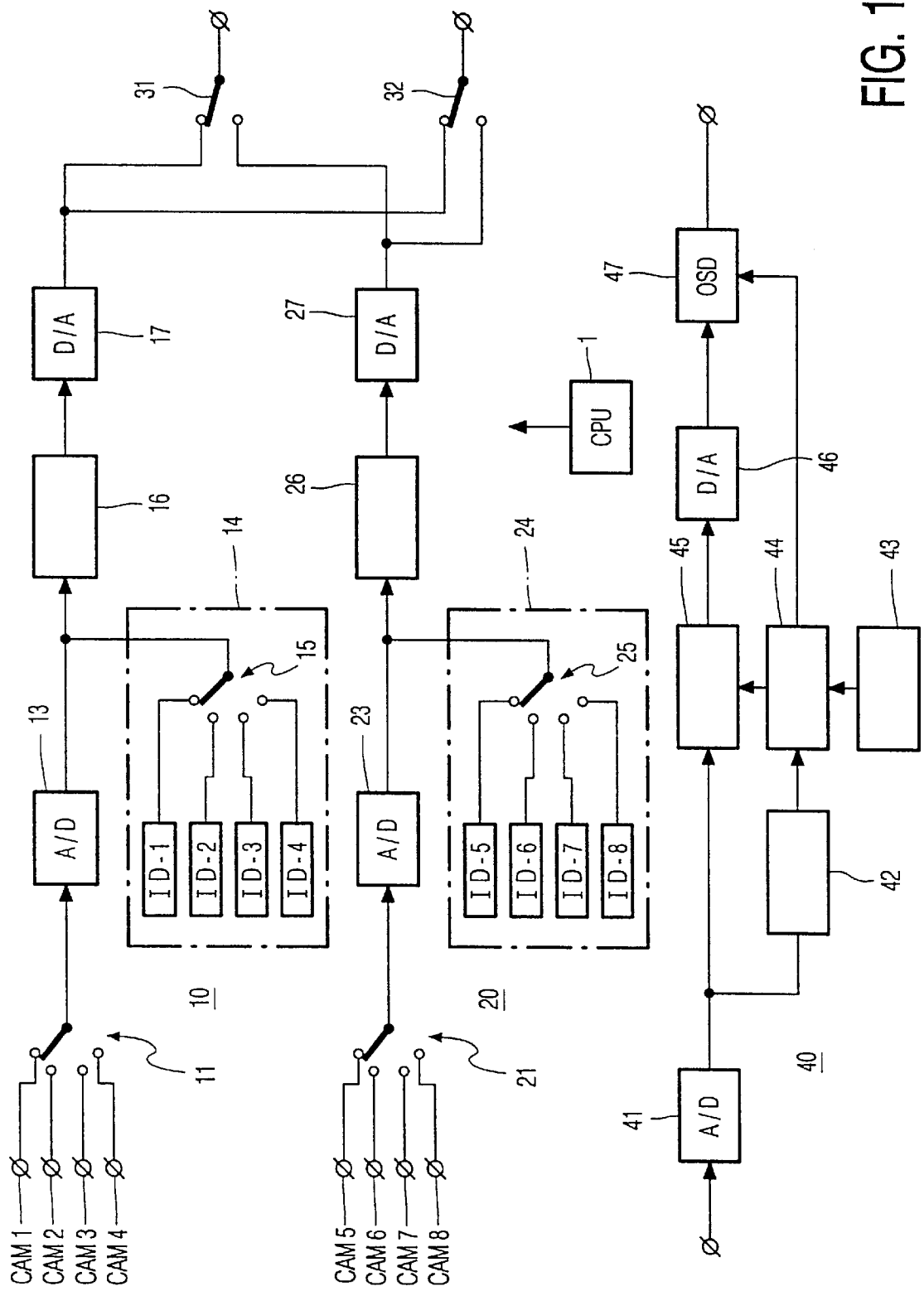
FIG. 1 is a block diagram of a first embodiment of a frame conversion device according to the invention.

The following reference signs are used in the drawings:

1: CPU 11, 21: switch (signal input means) 13, 23: A/D converter

14, 24: identification signal assigning part 15, 25: switch

16, 26: frame memory (storage means) 17, 27: D/A converter

31, 32: switch (signal output means) 40: frame unit for reproducing

41: A/D converter 42: ID detecting part 43: operating part

44: reproduction controlling part 45: frame memory 46: D/A converter

47: on-screen display part.

DESCRIPTION OF THE PREFERRED EMBODIMENTS

Next, embodiments of the present invention will be described with reference to attached drawings.

FIG. 1 is a block diagram showing the construction of a frame-converting device according to respective embodiments of the present invention. In FIG. 1, the device comprises a recording frame-converting unit having two routes, i.e., a first route (route A) 10 and a second route (route B) 20, each route having four inputs, and a reproduction frame unit 40. That is, the frame converting device of the present invention comprises the recording frame-converting unit and the reproduction frame unit 40 which operate independently of each other.

In FIG. 1, reference numeral 1 denotes a CPU as control means for controlling respective elements of the device. The CPU 1 especially controls switching respective switches and controls writing/reading storage means.

Numeral 11 denotes a switch as signal input means for switching inputs of four image signals CAM1 to CAM4 (television cameras 1 to 4). Numeral 13 denotes an A/D converter that converts an image signal passed through the switch 11 into a digital image signal.

Numeral 14 denotes an identification signal supply unit which supplies an identification signal (ID1 to ID4) to a non-image area (vertical retrace period or the like) of the digital image signal so as to identify from which camera the signal comes. Note that the identification signal supply unit 14 includes identification signal generators (ID_1 generator to ID_4 generator) for generating the respective identification signals and a switch 15.

Numeral 16 denotes a frame memory as storage means for storing a plurality of switched digital image signals respectively in frame units. Note that the frame memory 16 preferably is having independently operative input port and output port switches a memory.

Numeral 17 denotes a D/A converter that D/A converts the digital image signal read from the frame memory 16 into an analog image signal. Note that the switch 11 to the D/A converter 17 constructs the first route (route A).

Numeral 21 denotes a switch as signal input means for switching input of four image signals CAM5 to CAM8 (cameras 5 to 8). Numeral 23 denotes an A/D converter that converts the image signal passed through the switch 21 into a digital image signal.

Numeral 24 denotes an identification signal supply unit which supplies an identification signal (ID5 to ID8) to a non-image area (vertical retrace period or the like) of the digital image signal so as to identify from which camera the signal comes. Note that the identification signal supply unit 24 includes identification signal generators (ID_5 generator to ID_8 generator) for generating the respective identification signals and a switch 25.

Numeral 26 denotes a frame memory as storage means for storing a plurality of switched digital image signals respectively in frame units. Note that the frame memory 26 preferably is having independently operative input port and output port such as a memory.

Numeral 27 denotes a D/A converter that D/A converts the digital image signal read from the frame memory 26 into an analog image signal. Note that the switch 21 to the D/A converter 27 constructs the second route (route B).

Further, numeral 31 denotes a monitor output switch as signal output means for alternately reading an image signals stored in the respective frame memories 16 and 26 by alternately switching the route A and the route B and outputting them.

Further, numeral 32 denotes a VCR output switch for outputting image signals for recording in an external VCR, as signal output means for alternately reading image signals stored in the respective frame memories 16 and 26 by alternately selecting the route A and the route B outputting them.

Numeral 41 denotes an A/D converter which A/D converts the image signal, that has been sent from the recording frame-converting unit then recorded by the VCR, and reproduced by the VCR. Numeral 42 denotes an ID detector that detects the identification signal included in the A/D converted digital image signal. Numeral 43 denotes an operation unit for operation of selection to extract a desired image signal.

Numeral 44 denotes a reproduction controller which read/write controls the frame memory 45 based on the detected identification signal and the operation of selection, and controls a channel display on an on-screen display in accordance with the detected identification signal. The frame memory 45 is used for storing a desired image signal to reproduce under the control of the reproduction controller 44.

Numeral 46 denotes a D/A converter that D/A converts the digital image signal read from the frame memory 45 into an analog image signal. Numeral 47 denotes an on-screen display unit (OSD) which superimpose-outputs a channel display in accordance with the identification signal on the analog image signal, under the control of the reproduction controller 44. Note that the on-screen display unit 47 comprises a character generator, a superimpose circuit and the like.

The frame converting device having the above construction can continuously output synchronized image signals by storing respective asynchronous image of eight inputs in the recording frame-converting unit into two frame memories. Further, in parallel to this operation, the device detects the identification signals included in the image signals in frame units, extract frame timing of an image signal with a predetermined identification signal from the image signals in frame units, and the image signal of the frame timing and continuously outputs them. Thus, the device can extract a desired image signal from image signals switched to form one signal and outputs them.

Figure 2:
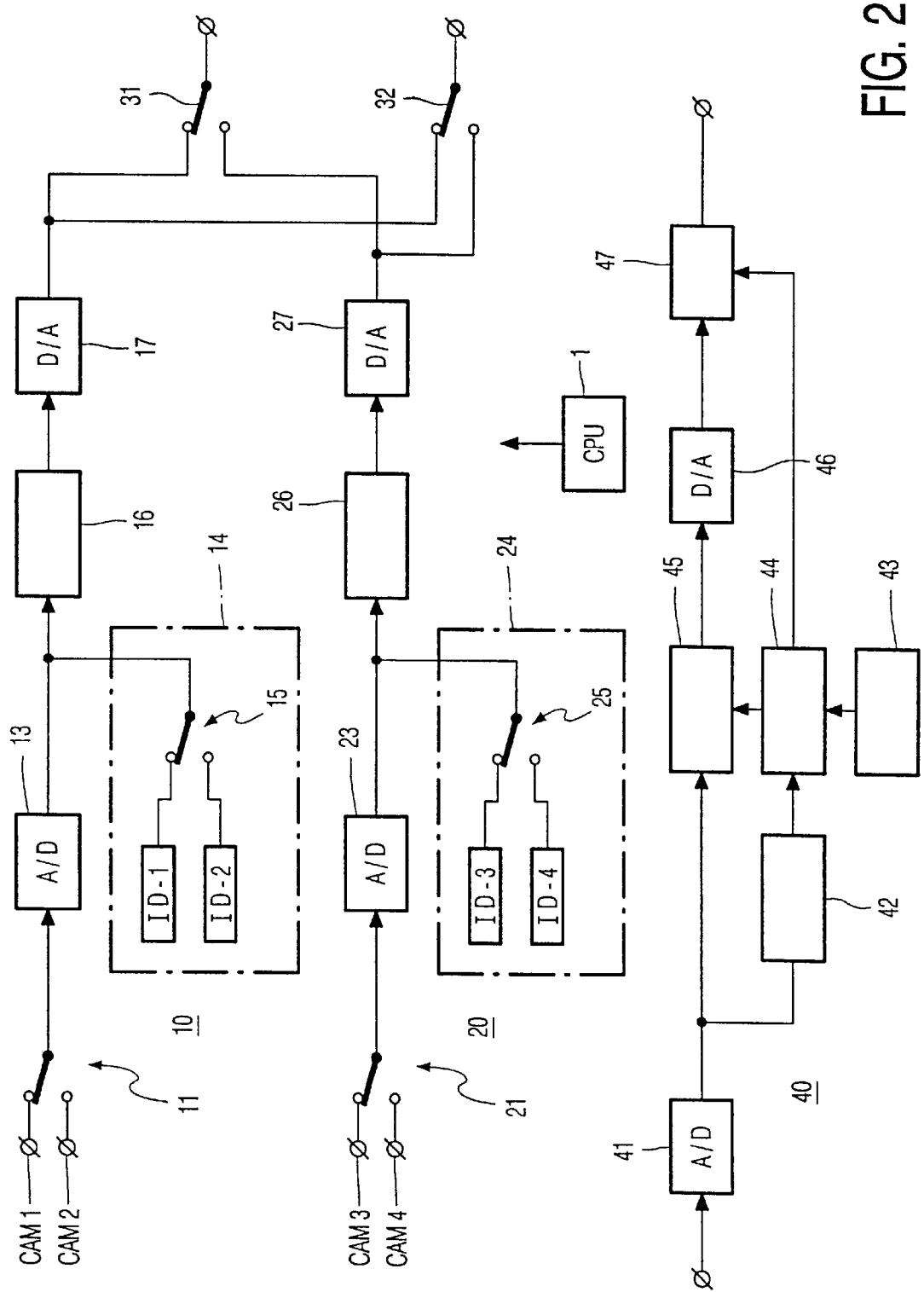
FIG. 2 is a block diagram of a second embodiment of a frame conversion device according to the invention.

Hereinafter, the operation will be described with reference to a timing chart. Note that for the sake of simplification of explanation, description will be made by using a frame converting device shown in FIG. 2 for two inputs, two routes and one output (four input and one output) in each route, as the recording frame-converting unit. In FIG. 2, the elements identical to those in FIG. 1 have the same reference numerals, and overlapped explanation will be omitted.

First, the CPU 1 generates a reference synchronizing signal for operating the respective elements of the device. In this case, the reference synchronizing signal may be a synchronizing signal independent of CAM1 to CAM4 or may be a synchronizing signal synchronized with any of CAM1 to CAM4. Herein after as an example, a synchronizing signal of the signal CAM1 is used as the reference synchronizing signal (FIG. 3(*a*)).

Then the CPU 1 supplies a select A signal to the switch 11 for switching the input in the route A. The select A signal is used to alternately select the image signal from the CAM1 and the image signal from the CAM2, in two-frame units.

Similarly, the CPU 1 supplies a select B signal to the switch 21 for switching the input in the route B. the select B signal is used to alternately select the image signal from the CAM3 and the image signal from the CAM4, in two-frame units. Further, the select B signal is one-frame phase shifted from the select A signal.

In this case, as the select A signal and the select B signal are switched in two-frame units, the asynchronous and inconstant timing image signal for one frame is included in any one of two frame periods.

First, when the switch 11 is on the CAM1 side in accordance with the select A signal (FIG. 3(*b*)), the image signal of the CAM1 is passed through the switch 11 and converted by the A/D converter 13 into a digital image signal at a timing within the two-frame periods. In parallel to this operation, the identification signal ID_1 from the switch 15, have been switched in accordance with the select A signal, is supplied within the retrace period of the digital image signal. The signal is stored into the frame memory 16 (CAM1 in FIG. 3(c)).

Further, when the switch 11 is switched to the CAM2 side in accordance with the select A signal, the image signal to the CAM2 is passed through the switch 11 and converted by the A/D converter 13 into a digital image signal at a timing within the two-frame periods. In parallel to this operation, the identification signal ID_2 from the switch 15, have been switched in accordance with the select A signal, is supplied within the retrace period of the digital image signal. The signal is stored into the frame memory 16 (CAM2 in FIG. 3(c)).

Figure 3A:
FIG. 3 is a time chart that shows an operation statement of a frame conversion device as shown in FIG. 2.
Figure 3B:
Figure 3C:
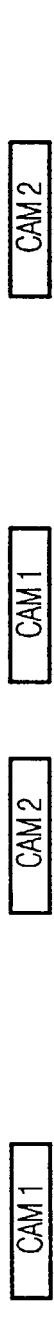
Figure 3D:
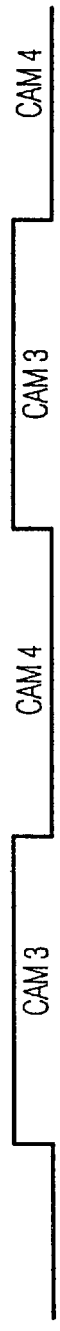
Figure 3E:
Figure 3F:
Figure 3G:

Further, when the switch 11 is switched to the CAM3 side in accordance with the select B signal (FIG. 3(d)), the image signal of the CAM3 is passed through the switch 21 and converted by the A/D converter 23 into a digital image signal at a timing within the two-frame periods. In parallel to this operation, the identification signal ID_3 from the switch 25, have been switched in accordance with the select B signal, is supplied within the retrace period of the digital image signal. The signal is stored into the frame memory 26 (CAM3 in FIG. 3(e)).

Further, when the switch 21 is switched to the CAM4 side in accordance with the select B signal, the image signal of the CAM 4 is passed through the switch 21 and converted by the A/D converter 23 into a digital image signal at a timing within the two-frame periods. Then, in parallel to this operation, the identification signal ID_4 from the switch 25, switched in accordance with the select B signal, is supplied which the retrace period of the digital image signal. The signal is stored into the frame memory 26 (CAM4 in FIG. 3(c)).

Further, reading from the frame memory 16 is performed at a timing of the last one frame within the respective two frame periods of the select A signal, based on the synchronizing signal (FIG. 3(a)). That is, when the select A signal is the CAM1 in the last one frame period of the CAM1, the digital image signal of the CAM1 is read from the frame memory 16 (CAM1 in FIG. 3(f)). Further, when the select A signal in the last one frame period of the CAM2, the digital image signal of the CAM2 is read from the frame memory 16 (CAM2 in FIG. (f)). Note that the read digital image signal is converted by the D/A converter 17 into an analog image signal.

Similarly, reading from the frame memory 26 is performed at a timing of the last one frame within the respective two frame periods of the select B signal, based on the synchronizing signal (FIG. 3(a)). That is, when the select B signal is in the last one frame period of the CAM3, the digital image signal of the CAM3 is read from the frame memory 26 (CAM3 in FIG. 3(g)). Further, when the select B signal is in the last one frame period of the CAM4, the digital image signal of the CAM4 is read from the frame memory 26 (CAM4 in FIG. (g)). Note that the read digital image signal is converted by the D/A converter 27 into an analog image signal.

Figure 3H:

Then, the switch 31 is controlled to be switched for each one frame in synchronization with the synchronizing signal (FIG. 3(a)). As shown in FIG. 3(h), as the monitor output, an image signal in a synchronized state for each one frame, as CAM1 CAM2 CAM3 CAM4 . . . is outputted.

Further, the switch 32 is controlled to be switched for each one frame in synchronization with the synchronizing signal (FIG. 3(a)). As shown in FIG. 3(h), as the VCR output, an image signal in a synchronized state for each one frame, as CAM1 CAM2 CAM3 CAM4 . . . is outputted. The monitor display is performed on an external display or the like by using the image signal.

In this manner, the frame converting can device continuously outputs sequentially switched image signals in a synchronized state by storing four asynchronous output image signals into two frame memories. The recording is made by the external VCR based on the image signal. At this time, the recording of the external VCR is continuously made.

Then, as the respective image signals are provided with the identification signal, it is possible to superpose a camera number or the like on a displayed image, for example, by utilizing the identification signals without recording character information indicative of the camera number or the like on a recording medium for the VCR, on the display device side which receives the monitor output or the VCR device side which receives the VCR output. Note that this construction can prevent miss of image information on the recording medium in comparison with a case of recording character information.

Figure 3I:
Figure 3J:
Figure 3K:

Further, in the VCR device, it is possible to extract only an image of a desired camera from a signal recorded on a tape. That is, is reproduced the image tape where the signal from the recording frame-converting unit is recorded, and the reproduced image signal is supplied to a VCR input (the input side of the A/D converter 41). FIG. 3(i) shows the image signal reproduced in this case. Note that input of the image signal into the A/D converter 41 is made independently of the operation of the recording frame-converting unit.

Then, assuming that selection has been made at the operation unit 43 to select a channel 1 (CAM1), the reproduction controller 44 refers to the result of detection by the ID detector 42. Then the reproduction controller 44 performs read/write control on the frame memory 45, such that if the identification signal of the signal CAM1 has been detected, the signal is written into the frame memory 45, on the other hand, if the identification signal of other signal than the CAM1, the selected signal is read from the frame memory 45 (FIG. 3(j)).

Then, the digital image signal read from the frame memory 45 is D/A converted and outputted as an analog image signal. Further, on the on-screen display unit 47, display indicating that the image is based on the signal of the CAM1 (channel display) is superimposed at a predetermined position in the image. In such manner, the image signal of the CAM1 selected from the operation unit 43 is extracted, and continuously outputted to a PB monitor output. Note that as the PB monitor output is obtained independently of the operation of the recording frame-converting unit, the VCR recording can be performed in parallel to the VCR reproduction.

Note that the description has been made as an example where four inputs of image signals are switched, however, even in case of eight inputs of image signals as shown in FIG. 1, image signals, sequentially switched in a synchronized state, can be outputted. Further, even if the number of CAM inputs is greater, the operation can be made without any problem.

Further, in the example, the CAM input image signals are in an asynchronous state, however, even if synchronous image signals are inputted, the operation can be made without any problem. Further, the asynchronous image signals from cameras have been used as the CAM1 to CAM4, however, devices which generate various image signals can be employed as well as the television cameras.

Further, in the above description, the CAM1 is extracted in the reproduction frame unit 40, however, the image signal may be switched for another CAM image signal at arbitrary timing. Further, it may be arranged such that, if any operation has not been performed since the power was turned on, display is performed based on a predetermined image signal or an image signal with the least number.

Further, display may be performed by switching the signals as CAM1 CAM2 CAM3 CAM4 CAM1 . . . in predetermined second (a predetermined number of frames) units. That is, if the image signal from the VCR in FIG. 3(*i*) is used, the image signal is switched for each one frame and the display cannot be visible. However, if display is switched every several seconds, the situation of respective CAM inputs can be obtained.

As described in detail above, the frame converting device described in this specification time-divisionally stores and reads a plurality of image signals with respect to a plurality of storage means fewer than the input image signals while switching the signal input means and the signal output means at predetermined timing. Thus, the device continuously outputs the image signals in a synchronized state while switching the asynchronous image signals.

Further, the frame converting device detects identification signals included in the image signals in frame units, extract frame timing of an image signal with a predetermined identification signal from the image signals in frame units, and stores and continuously outputs the image signal of the frame timing. Thus, the device extracts and outputs a desired image signal from image signals switched to form one signal.

Further, as the frame converting device of the present invention comprises a recording frame-converting unit and a reproduction frame unit, the two conversion processing operations can be realized, independently, and further in parallel in accordance with necessity, by one frame converting device, without preparing a frame converting device for recording and a frame converting device for reproduction.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In the device claim enumerating several means, several of these means can be embodied by one and the same item of hardware.

What is claimed is:

1. A frame conversion device, comprising:
    a frame conversion unit for recording an image signal optionally selected from a plurality of asynchronous input image signals; and
    a frame unit for reproducing a recorded signal outputted from the frame conversion unit independently of the operation of the frame conversion unit,
    wherein the frame conversion unit includes:
        a plurality of signal input means for obtaining a selected asynchronous image signal from at least one asynchronous image signal,
        identification signal assigning means for assigning to a non-image region of the selected asynchronous image signal an identification signal for identifying the selected asynchronous image signal,
        a plurality of frame-converting storage means for storing the selected asynchronous image signal, and
        signal output means for selectively reading and then outputting the asynchronous image signal stored in the plurality of frame-converting storage means, and
    wherein the frame unit includes:
        identification signal detecting means for detecting the identification signal included in the asynchronous image signal in a unit of frame produced in the frame conversion unit,
        reproduction controlling means for extracting a frame timing of the asynchronous image signal assigned a predetermined identification signal from the image signals in a unit of frame, and
        storage means for, at the frame timing extracted by the reproduction controlling means, storing an asynchronous image signal corresponding to the predetermined identification signal and for continuously outputting said asynchronous image signal.

2. A frame conversion device as claimed in claim 1, further comprising a character generating means for superimposing on the asynchronous image signal stored in and then outputted from the storage means to reproduce a display of character based on the identification signal included in said asynchronous image signal.

3. A frame conversion device as claimed in claim 1, wherein the asynchronous image signal supplied to the frame unit is a signal from a video cassette recorder which records and reproduces the asynchronous image signal outputted from the frame conversion unit.

4. A frame conversion device as claimed in claim 1, wherein the frame timing of the asynchronous image signal to which a predetermined identification signal to be extracted by the reproduction controlling means is assigned, is based on an input operation from an operating means.

5. A frame conversion method, comprising:
    obtaining a selected asynchronous image signal from at least one image signal;
    assigning to a non-image region of the selected asynchronous image signal an identification signal for identifying the selected asynchronous image signal,
    storing the selected asynchronous image signal, and
    selectively reading and then outputting the stored asynchronous image signal, and
    independently of the above-mentioned steps:
        detecting the identification signal included in the asynchronous image signal;
        extracting a frame timing of the asynchronous image signal assigned a predetermined identification signal from the asynchronous image signals in a frame, and
        storing an asynchronous image signal corresponding to the predetermined identification signal at the extracted frame timing, and continuously outputting said asynchronous image signal.

* * * * *